United States Patent [19]
Conlee et al.

[11] Patent Number: 5,332,259
[45] Date of Patent: Jul. 26, 1994

[54] VENT CONTROL DEVICE FOR AIR BAG HOUSING

[75] Inventors: James K. Conlee, Dayton; Jeffrey A. Shepherd, Fairborn, both of Ohio

[73] Assignee: General Motors Corporation, Detroit, Mich.

[21] Appl. No.: 6,282

[22] Filed: Jan. 19, 1993

[51] Int. Cl.⁵ ............................................. B60R 21/30
[52] U.S. Cl. .................................. 280/738; 280/731
[58] Field of Search .................. 280/738, 731, 732

[56] References Cited

U.S. PATENT DOCUMENTS

| | | |
|---|---|---|
| 3,573,885 | 4/1971 | Brawn et al. ................... 280/738 |
| 3,938,826 | 2/1976 | Giorgini et al. ................ 280/738 |
| 4,500,114 | 2/1985 | Giey, Jr. ...................... 280/738 X |
| 4,805,930 | 2/1989 | Takada .......................... 280/739 |
| 5,016,913 | 5/1991 | Nakajima et al. ............... 280/738 |
| 5,100,172 | 3/1992 | Van Voorhies et al. .......... 280/738 |
| 5,193,847 | 3/1993 | Nakayama ....................... 280/738 |
| 5,207,450 | 5/1993 | Pack, Jr. et al. ............... 280/738 |

FOREIGN PATENT DOCUMENTS

| | | | |
|---|---|---|---|
| 1324401 | 7/1973 | United Kingdom ............... 280/738 |
| 2257951 | 1/1993 | United Kingdom ............... 280/738 |

Primary Examiner—Joseph D. Pape
Attorney, Agent, or Firm—Ernest E. Helms

[57] ABSTRACT

An occupant restraining inflatable cushion apparatus includes a gas generator used to inflate an inflatable fabric cushion which is packaged about the gas generator in a deflated condition. The cushion and gas generator are connected with a closed end of a housing having diverging side walls. The side walls of the housing have venting apertures. The side wall of the cushion also has apertures which, upon inflation of the air bag, register with the apertures in the housing, allowing aspiration of the air bag through the side walls of the housing. Therefore, direct venting through the air bag into the vehicle occupant compartment is avoided.

6 Claims, 3 Drawing Sheets

VENT CONTROL DEVICE FOR AIR BAG HOUSING

BACKGROUND OF THE INVENTION

The present invention relates to an inflatable occupant restraint system commonly referred to as air bags. More particularly, the present invention relates to an apparatus and method of utilization of an aspirated/vented air bag system particularly useful in automotive vehicles.

It is well known in vehicle occupant restraint systems to provide an inflatable nylon-like fabric air bag which is inflated by a gas generator. The gas generator for the passenger inflatable restraint system is preferably a cylindrical metal housing which contains chemicals such as sodium azide and has ports therein through which gases generated by a chemical reaction within the cylinder may be exhausted into the inflatable cushion to inflate the cushion.

To reach the desired expansion of the cushion requires a relatively large amount of gas, which in turn requires a fairly large generator.

It is also necessary to be able to quickly deflate the cushion to control normal system performance and for instances wherein the cushion may engage an obstruction, such as an occupant in an unusual seating position. In prior air bag systems, various devices have been employed to vent the cushion, such as with external cushion bag vents. In operation, when the cushion is filled and unfolded to a given position, the vents become active and inflation gas may be exhausted. Such exhaust means are useful, but they create the potential that the cushion may shift and block all or part of a vent. The above-noted occurrence prevents gas from being exhausted from the cushion at a maximum rate. Another potential problem encountered with external cushion bag vents is that they exhaust inflation gases directly into the occupant compartment. Finally, because of their location on the cushion, external vents do not have the ability to alleviate "break out" forces. Break out is the initial part of a deployment where a folded cushion is forced through a protective cover.

An additional requirement which has been imposed by the trend toward stiff crash pulse vehicles is an increase in the speed of inflation. The more aggressive inflation rate greatly increases the break out forces generated.

An attempt to meet the above concerns has been brought forth by the development of vented housing vehicle air bag systems, by which it is meant that inflation gases may be vented through the housing instead of external cushion vents.

Venting through the housing has seen limited use. However, air bag systems which use vented housings have cushion attachment techniques which mount the cushion around the mouth of the housing, which then requires twelve or more rivets to attach the cushion bag with a flange along an open end of the housing. The large number of rivets for attaching the cushion is a cost disadvantage when assembly, part and tooling costs are considered. Also, with prior vented housings, after a deployment, the inflator (located within the housing near the vents) is exposed to the air under the instrument panel, which is oxygen-rich.

SUMMARY OF THE INVENTION

To overcome the above-noted problems, the present invention is brought forth. The present invention allows the use of a wrap-around type air bag system which either aspirates or vents through the cushion and through a housing wall. Therefore, venting apertures cannot be blocked by foreign objects, gas and/or fumes are always directed away from the vehicle occupants. In addition, break out forces are reduced. Aspiration or venting is allowed through the housing wall without the requirement of a housing flange/cushion attachment mechanism.

Other advantage of the present invention will become more apparent to those skilled in the art as the nature of the invention is better understood from the accompanying drawings and a detailed description.

DESCRIPTION OF THE PREFERRED EMBODIMENT

Figure 1:
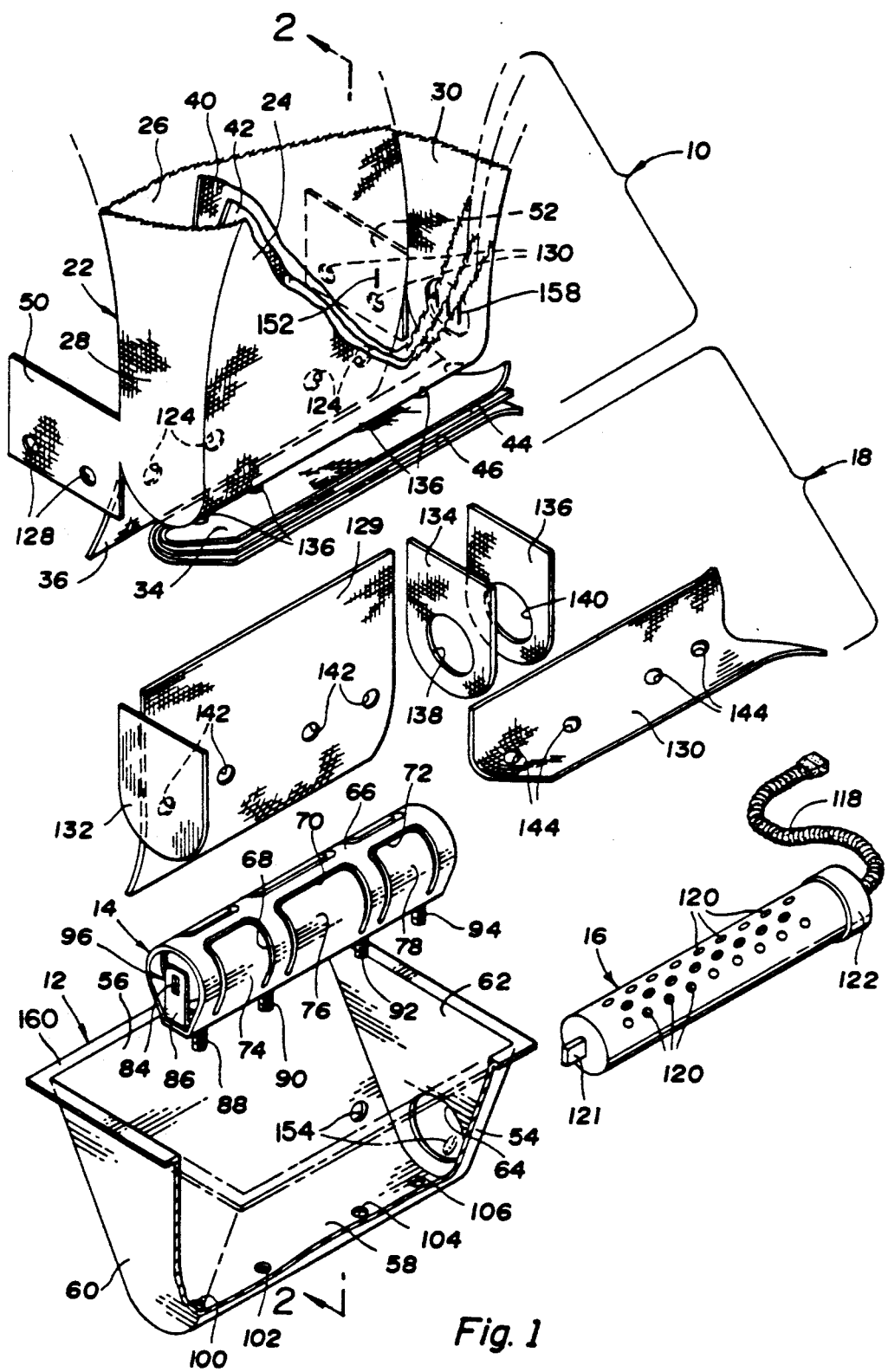
FIG. 1 is an exploded view of an inflatable occupant restraint cushion accompanying to the invention.

A conventional occupant restraint system includes an inflatable cushion 10, housing or mounting can 12, an optional heat shield retainer 14, and a gas generator 16. An optional high temperature resistive liner 18, as shown in exploded fashion in FIG. 1, can also be included if desired.

Figure 3:
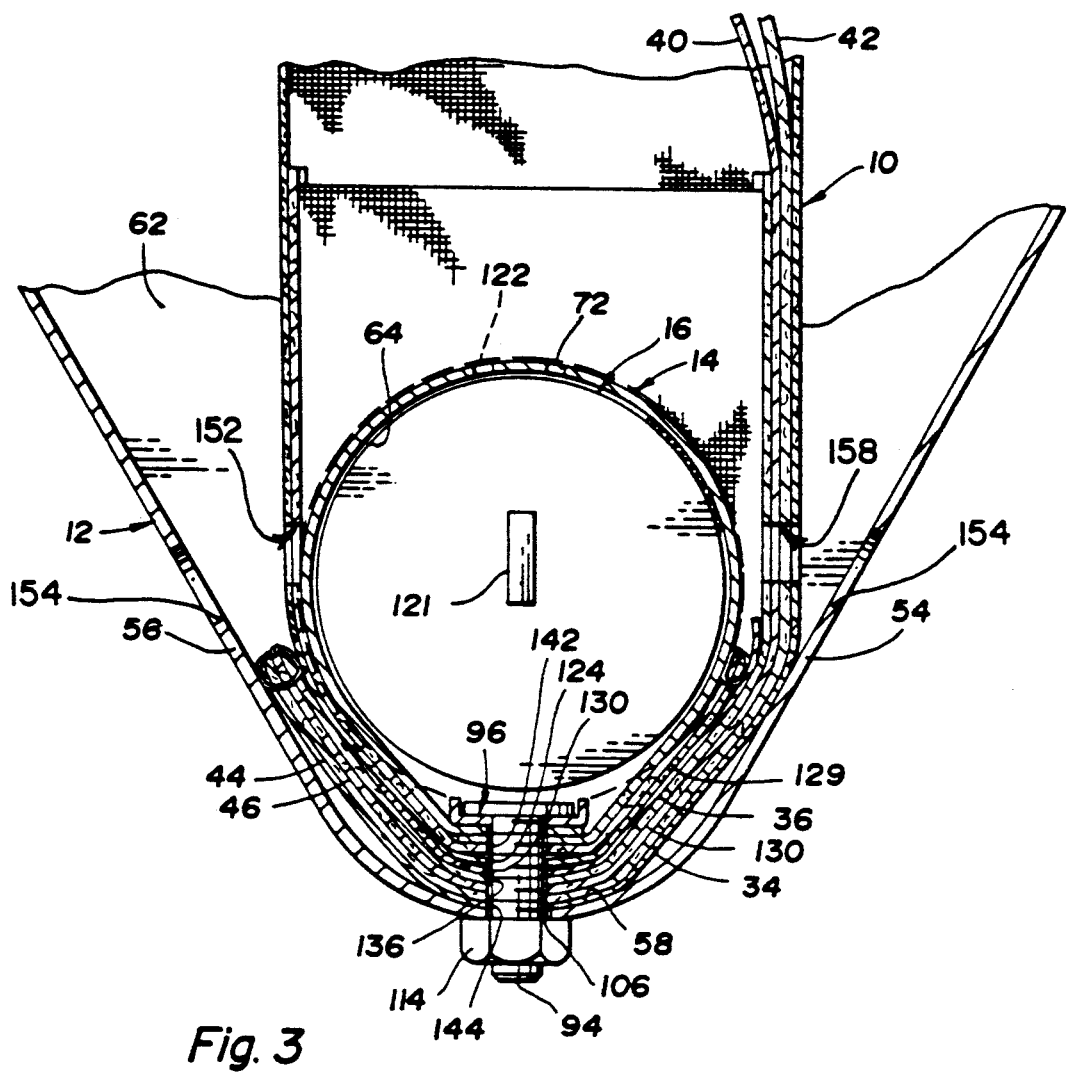
FIG. 3 is a cross-sectional view taken in the direction of arrows 3—3 of FIG. 2.
Figure 4:
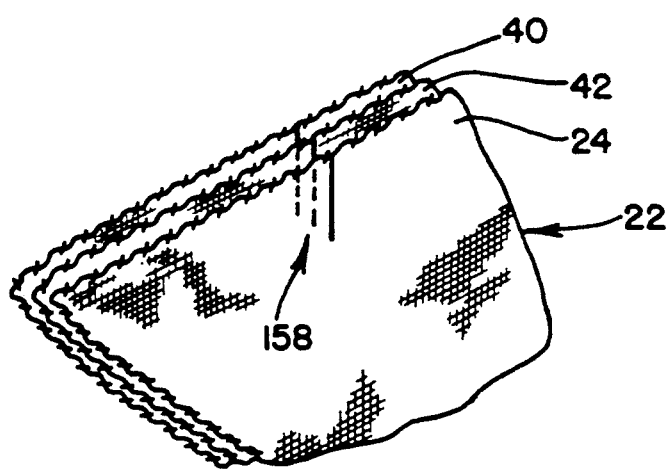
FIG. 4 is a perspective view of circled area of Figure I showing an edge of the high temperature resistive fabric having stitches along the edges thereof to prevent fraying of the fabric by the stream of high temperature gas emanating from the gas generator.

Referring to FIGS. 1 and 3, it is seen that the inflatable cushion 10 is a bag or pillow 22 fashioned of sewn-together fabric pieces. The bag 22 includes multiple ply side walls 24 and 26 which are sewn together by end walls 28 and 30. The side wall 26 (at tis right-hand end in FIG. 1) has a penetrating longitudinal slotted venting aperture 152. In like manner, at its right-hand end, the side wall 26 has a penetrating longitudinal slotted, vented aperture 158 (at its right hand in FIG. 1).

The top of the bag, not shown in the drawings, is closed and the bottom of the bag has an opening separate from the vented apertures 158, 152. The opening is open and defined by a flap 34 of the side wall 24 and a flap 36 of the side wall 26. The bag 28 also includes two additional pieces of fabric 40 and 42 which are tethers having their upper ends, not shown, sewn to the inside of either the side walls 24 or 26 to give shape to the bag 22 when the bag is inflated by a high temperature gas, as will be discussed hereinafter. The lower ends of the tethers 40 and 42 carry flaps 44 and 46. A pair of closure straps 50 and 52 extend from the end walls 28 and 30.

The mounting can 12 is a component optionally fabricated from stamped steel having converging side walls 54 and 56 connected along a closed end or spine 58 and having end panels 60 and 62. The end panel 62 has an access opening 64 through which the gas generator 16 may be inserted. The side walls 54, 56 each have a venting aperture 154, and an open end of the housing extends toward the vehicle occupant (not shown).

Figure 2:
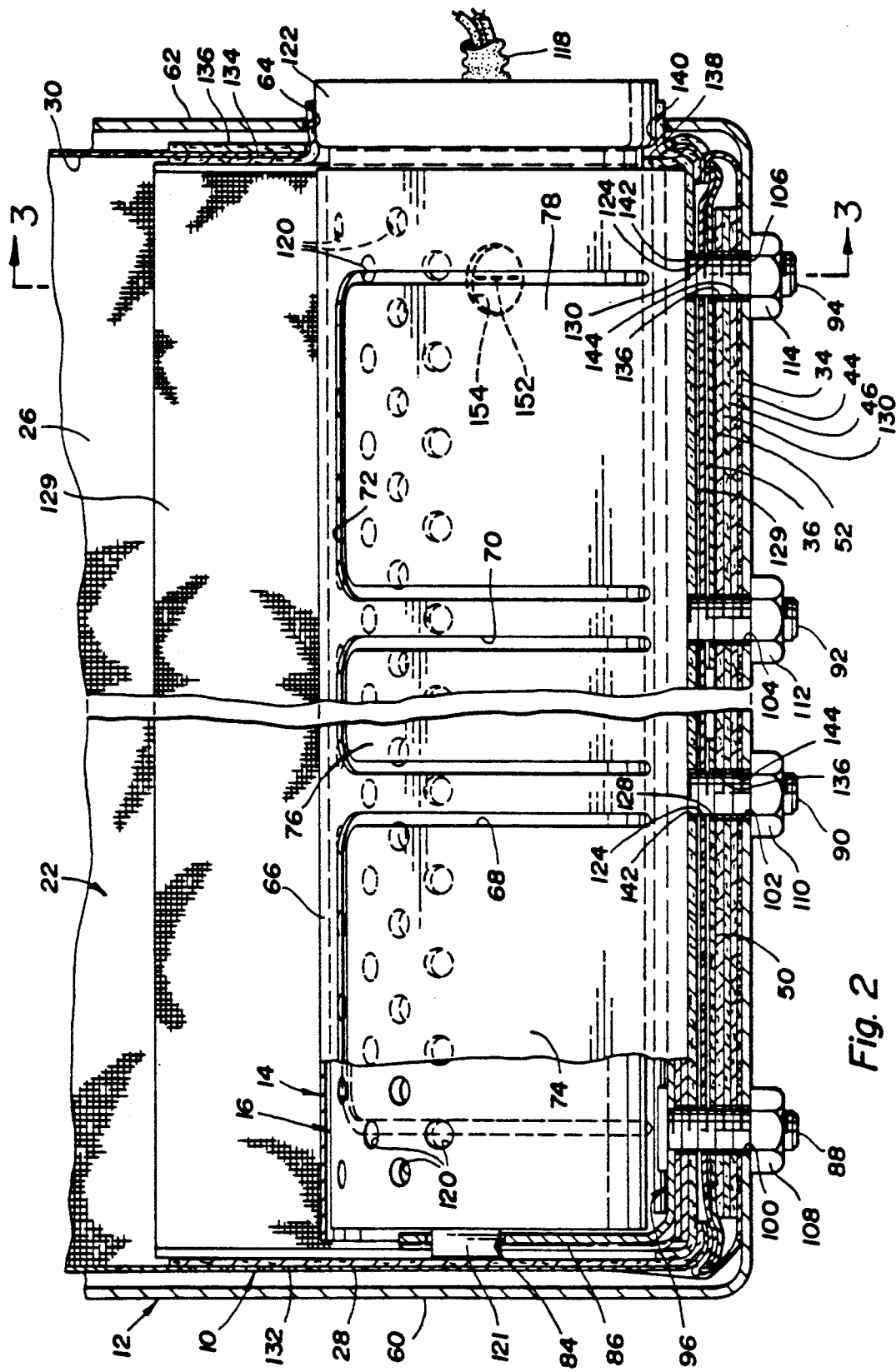
FIG. 2 is a section view taken in the direction of arrow 2—2 of FIG. 1 and showing a section of the inflatable occupant restraint cushion when fully assembled.

The heat shield retainer 14 is of stamped steel construction and has a cylindrical wall 66 in which a series of slots are cut as at 68, 70 and 72 to define flaps 74, 76 and 78. The one end of the heat shield retainer 14 carries a mounting tab 86 which projects into the cylindrical heat shield and has a rectangular mounting opening 84 therein. As best seen in FIGS. 1 and 2, the heat shield retainer 14 may be fixedly attached to the mounting can 12 by a plurality of mounting bolts 88, 90, 92 and 94 which project downwardly from the heat shield retainer 14. These mounting bolts are preferably connected together by a bolt carrier 96 which has the bolts, 88, 90, 92 and 94 suitably attached thereto along the length thereof. The mounting can 12 has bolt holes 100, 102, 104 and 106 spaced along the spine thereof through which the bolts 88, 90, 92 and 94 are installed. Nuts 108, 110, 112, and 114 are installed on these bolts as shown in FIG. 2.

The gas generator 16 is a cylindrical-shaped housing having a chemical reaction chamber inside thereof and to which an actuator cable 118 extends. The gas generator 16 has a plurality of small ports 120 therein through which the hot gases created by the chemical reaction is exhausted into the inflatable cushion 10. The gas generator 16 carries a mounting projection 121 on the end thereof. The gas generator 16 is installed through the access opening 64 and the end wall 62 of mounting can 12, with the mounting rejection 121 extending into the mounting aperture 84 of the mounting tab 86 of heat shield retainer 14. An end ring portion 122 of the gas generator 16 with an optional enlarged diameter seats within the access opening 64 of end wall 62 as shown in FIG. 2. In this manner, the gas generator is fixedly connected within the mounting can 12.

The heat shield retainer 14 is assembled into the air bag 22 by inserting the heat shield 14 up into the lower end of the bag. The flaps 36 are provided with a plurality of apertures 124 therein which register and align with the mounting bolts 88, 90, 92 and 94 so that the flap 36 may be wrapped around the heat shield retainer 14. Then, the end straps 50 and 52 are wrapped around the heat shield. The end flair of apertures 128 which fit over the mounting bolts 88 and 90. Similarly, the end strap 52 has a pair of apertures 130 which fit over the mounting bolts 92 and 94. Then, the flaps 34, 44 and 46 are folded over the heat shield 16 as permitted by the plurality of apertures 136 which register with one another and fit over the bolts 88, 90, 92 and 94. By successively folding the flaps over the mounting bolts in this fashion, the inflatable cushion 22 is firmly anchored to the heat shield retainer 14 and the mounting can 12 in a manner by which the hot gases generated by the gas generator 16 are prevented from leaking out the bottom end of the bag 22 and are directed in the opposite direction to inflate the bag 22.

An optional heat resistive liner of high temperature fabric which is interposed between the heat shield 14 and the inflatable cushion 22. As best seen in FIG. 1, the liner 18 is fashioned from a plurality of individual pieces of fabric including a pair of side pieces 129 and 130 and end pieces 132, 134 and 136. The pieces 129, 130, 132, 134 and 136 may be sewn to each other for installation inside the inflatable cushion 22 as a unit or the individual pieces may be stitched into the inflatable cushion 22. In either case, the side piece 128 is juxtaposed with the side wall 28 on the inside of the air cushion, while the side piece 130 is juxtaposed with the tether 46. The end piece 132 fits against the end wall 28 of the inflatable cushion 22 while the end piece 134 fits inside the inflatable cushion 22 against the inside of end wall 30 and the end piece 136 fits against the outside of the end wall 30. In this way the two end pieces 134 and 136 sandwich the end wall 30 therebetween as best seen in FIG. 2. The end pieces 134 and 136 have apertures 138 and 140 therein which respectively align with the access opening 64 in the end wall 62 of the mounting can 60 to receive the gas generator 16.

As best seen in FIG. 1, the side piece 129 has a plurality of apertures 142 and the side piece 140 has a plurality of apertures 144 by which these pieces may be installed over the bolts 88, 90, 92 and 94.

As best seen by reference to FIGS. 2 and 3, the side pieces 129 and 130 of the liner 18 are interposed between the heat shield 14 and the side walls 26 and 30 of the bag 22. Likewise, as seen in FIG. 2, the end piece 132 of the liner 10 is interposed between the heat shield 14, the heat shield tab 84 and the end wall 28 of the bag 22. At the other end of the heat shield, the end pieces 134 and 136 are respectively positioned on the opposite sides of the end wall 30 of the inflatable cushion 22 so as to protect the end wall against contact with either the heat shield retainer 14 or the enlarged end 122 of the gas generator 16, and also to prevent contact with the region of the end wall 62 of the mounting can which is contacted by the enlarged end 122 of the gas generator 16.

In operation, due to a rapid deceleration condition, a communicated signal of an electrical current through the cable 118 to the gas generator 118 will initiate a chemical reaction, causing hot gases to be expelled through the ports 120 of the gas generator 16. This hot gas passes through the slots 68, 70 and 72 of the heat shield 14 and causes the flaps 74, 76 and 78 thereof to fold open and permit unrestricted flow of gas into the bag 22. The high temperature resulting from the intense chemical reaction within gas generator 16 will heat the gas generator 16 to substantially high temperatures.

The ignition of the gas generator 16 causes a resultant rapid expansion of gas, which causes the side walls 26 and 24 of the bag to mate with the side walls 54 and 56 of the can, respectively. This mating of the side walls with the side walls of the can will occur before the cover (not shown) which mates with a flange 160 can be opened by the bag 22. Accordingly, the venting apertures 152 and 158 of the bag will align with the venting apertures 154 of the can. Venting will begin initially through the apertures 154 of the can, which is typically located within the dashboard of the vehicle and therefore will be directed away from the occupant compartment. If by some unforeseen circumstance there is an article located in front of the cover attached to the housing flange 160, the impact upon that object will be lessened due to the fact of the venting through the housing which occurs in the initial stages of deployment of the air bag even before full deployment of the bag 22. After the cover is opened and the bag 22 unfolds into the passenger compartment, the volumetric expansion of the bag 22 will be greater than the expansion caused by the gas generator 16. Therefore, there will be aspiration into the bag 22 via the venting apertures 152, 158 of the bag and of the can 154. This additional air is beneficial in two aspects in that it provides a cooler bag 22 upon full deployment and allows full inflation of the air bag when air aspirated into the bag is heated by the gas generator 16 to provide an additional inflation due to the expansion of temperature of the air aspirated within the bag 22.

Upon vehicle occupant contact with the bag 22, the bag will then vent outward through its apertures 152, 158 and through the can apertures 154 which is beneficial in two aspects, that being preventing or minimizing a bounceback effect and rapidly collapsing the air bag 22 to inhibit it from interfering with any occupant reactions required to due the vehicle condition. Additionally, the vents cannot be blocked by any objects in the occupant compartment, and break out forces are greatly reduced.

The venting apertures of the can 154 (diameter) and the bag 152, 158 (length) are approximately 40 to 75 mm. The actual sizes will be tailored to the specific vehicle which utilizes the present invention. In like manner, the number of vents is also application specific.

To maximize the efficiency of the present invention, the bag 22 should be folded such that no portion of the bag juxtaposes with the housing walls 54, 56 next to the bag side walls 26 and 24, respectively. However, the present invention will still work if the bag is improperly folded; however, the reduction in break out force may be compromised.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An occupant restraining inflatable cushion apparatus comprising:
   a housing having a closed end and an open end with side walls connecting the open and closed ends, at least one side wall having at least one venting aperture;
   a cushion bag placed within the housing in a collapsed condition;
   means for expanding the cushion bag to an expanded condition located within the cushion bag; and
   wherein the cushion bag has a penetrating aperture for registration with the housing venting aperture.

2. An occupant restraining inflatable cushion apparatus as described in claim 1 wherein the aperture in the cushion bag is formed by a longitudinal 3. An occupant restraining inflatable cushion apparatus as described in claim 1 wherein is a multitude of apertures in the housing and in the cushion bag.

4. An occupant restraining inflatable cushion apparatus as described in claim 1 wherein the housing walls converge outwardly from the closed end.

5. An occupant restraining inflatable cushion apparatus comprising:
   a housing having a closed end and an open end with converging side walls connecting the open and closed ends, and a venting aperture in at least one of the side walls;
   a cushion bag connected within the housing in the closed end in a collapsed condition;
   a gas generator for expanding the cushion bag to an expanded condition located within the cushion bag adjacent the housing closed end; and
   wherein the cushion bag has a slitted aperture for registration with the housing venting aperture after an ignition of the gas generator, allowing for aspiration of the cushion bag.

6. A method of restraining an occupant in a vehicle who is subject to a rapid deceleration of the vehicle comprising:
   locating within the vehicle a housing having a closed end and an open end directed toward the vehicle occupant, the open and closed ends having side walls with at least one venting aperture;
   connecting adjacent the closed end of the housing a cushion bag in a collapsed condition;
   providing means for rapidly expanding the cushion bag to an expanded condition; and
   providing within the cushion bag an aperture for registration with the housing venting aperture to allow the cushion bag to aspirate via the housing venting aperture during its inflation.

* * * * *